United States Patent [19]

Melacini et al.

[11] 3,879,506

[45] Apr. 22, 1975

[54] PROCESS FOR PRODUCING CHLORO-VINYL FIBERS HAVING MODIFIED LIGHT REFLECTION

[75] Inventors: Paolo Melacini, Mestre; Helmut Kirschner, Abano; Paolo Campana, Vercelli, all of Italy

[73] Assignee: Chatillon Societa' Anonima Italiana per le Fibre Tessili Artificiali S.p.A., Milan, Italy

[22] Filed: May 26, 1971

[21] Appl. No.: 147,155

[30] Foreign Application Priority Data
June 1, 1970 Italy.................................. 25392/70

[52] U.S. Cl................. 264/49; 161/169; 161/174; 161/180; 260/2.5 M; 264/178 F; 264/205; 264/344
[51] Int. Cl.... B29c 25/00; B29d 27/00; D01d 5/04; D01d 5/06
[58] Field of Search.......... 260/2.5 M, 92.8; 264/49, 264/178 F, 205, 344; 161/169, 174, 180

[56] References Cited
UNITED STATES PATENTS

| | | | |
|---|---|---|---|
| 1,707,164 | 3/1929 | Karplus................................ | 264/49 |
| 2,810,932 | 10/1957 | Honey.................................. | 264/49 |
| 2,846,727 | 8/1958 | Bechtold.............................. | 264/49 |
| 2,984,869 | 5/1961 | Honey et al. ........................ | 264/49 |
| 3,108,993 | 10/1963 | Christman..................... | 260/92.8 R |
| 3,235,634 | 2/1966 | Michel................................. | 264/49 |
| 3,322,611 | 5/1967 | Stevenson ...................... | 264/49 X |
| 3,329,557 | 7/1967 | Magat............................. | 264/49 X |
| 3,341,628 | 9/1967 | Buning et al...................... | 260/899 |
| 3,342,911 | 9/1967 | Funahashi...................... | 264/49 X |
| 3,378,507 | 4/1968 | Sargent ......................... | 260/2.5 M |
| 3,378,507 | 4/1968 | Sargent et al. ................ | 260/2.5 M |
| 3,389,428 | 6/1968 | Denti et al................... | 264/178 F X |
| 3,524,753 | 8/1970 | Sharp............................ | 264/49 X |

FOREIGN PATENTS OR APPLICATIONS

| | | | |
|---|---|---|---|
| 455,743 | 4/1949 | Canada............................. | 264/205 |
| 715,966 | 8/1965 | Canada............................. | 264/205 |
| 163,948 | 7/1955 | Australia........................... | 264/49 |
| 855,213 | 11/1960 | United Kingdom........... | 260/92.8 R |
| 1,111,826 | 7/1961 | Germany...................... | 260/92.8 R |
| 1,133,130 | 7/1962 | Germany...................... | 260/92.8 R |
| 1,230,844 | 9/1960 | France ......................... | 260/92.8 R |
| 1,259,267 | 3/1961 | France ......................... | 260/92.8 R |
| 1,261,690 | 4/1961 | France ......................... | 260/92.8 R |
| 6,400,858 | 8/1964 | Netherlands.................. | 260/92.8 R |

OTHER PUBLICATIONS
Smith, W. Mayo "Vinyl Resin," New York, Reinhold, c 1958 pp. 82–87 (Reinhold Plastics Applications Series).
Natta, G. P. Corradini "The Structure of Crystalline 1,2-Polybutadiene and of Other "Syndyotactic Polymers," In Journal of Polymer Science. Vol. XX, Pages 254–266 (1956).
Burleigh, P. H. "A New Method for the Preparation of Crystalline Polyvinyl Chloride" communications to the editor in Journal of the American Chemical Society. Vol. 82, No. 3, February 5, 1960, Page 749.
Johnsen, UWE "Hochaufgeloste Kernresonanzspektren Von Polyvinylchlorid" In Journal of Polymer Science. Vol. 54, Issue 159 (1961), pp. 56–58.
Bailey, F. E.; J. P. Henry, R. D. Lundberg; J. M. Whelan, "The Preparation of Head–to–Head Poly(vinyl Chloride). In Polymer Letters of Journal of Polymer Science, B2, Vol. 2. pp. 447–451.
Burnett, G. M.; F. L. Ross, "Environmental Effects in Free-Radical Polymerizations. Part III. Vinyl Chloride and n-Butyraldehyde." In Journal of Polymer Science. Part A-1, Vol. 5, pp. 1467–1480 (1967).
Smith, R. W., C. E. Wilkes, "Single Crystals of Low Molecular Weight Poly(vinyl Chloride)" In Polymer Letters of the Journal of Polymer Science, Part B. Vol. 5, No. 5, pp. 433–436 (May 1967).
Miller, M. L. "The Structure of Polymers" New York, Reinhold, c 1966, pp. 373–389, 420. (spe Polymer Science and Engineering Series).
Kirk–Othmer Encyclopedia of Chemical Technology Second completely revised edition. Vol. 21, Section. "Vinyl Polymers Chloride" New York, Interscience, c 1970, pp. 379–387, 409.
Encyclopedia of Polymer Science and Technology, Vol. 14, Sections Vinyl Chloride Polymers (Properties) and "Chlorinated Poly(vinyl) Chloride)" New York, Interscience, c 1971, pp. 360–366, 392–394, 460–468.

*Primary Examiner*—Philip E. Anderson
*Attorney, Agent, or Firm*—Cohen and Stiefel Hubbell

[57] ABSTRACT

Textile fibers composed of vinyl chloride homopolymers or of copolymers containing at least 80% by weight of vinyl chloride or mixtures thereof having an appearance (sheen) and a feel similar to those of animal hair are prepared by incorporating into the spinning solution from which the fibers are spun at least about 1% by weight of the polymer of a white or colorless salt having a density in excess of about 2 g/cc, extruding the fiber, and then removing at least a part of the salt from the surface of the resulting fiber with water or another solvent for the salt.

4 Claims, No Drawings

3,879,506

PROCESS FOR PRODUCING CHLORO-VINYL FIBERS HAVING MODIFIED LIGHT REFLECTION

BACKGROUND OF THE INVENTION

1. Field of the Invention

The present invention is a process for preparing chloro-vinyl fibers having a modified light reflection. More particularly, the invention is a process for producing chloro-vinyl fibers having an appearance and a feel similar to those of animal hair.

The term "chloro-vinyl fibers", as used herein is intended to mean fibers obtained by means of any kind of spinning of a polymer selected from the group consisting of a) homopolymers of vinyl chloride and copolymers of vinyl chloride containing at least 80% by weight of vinyl chloride obtained by polymerization at a temperature greater than 0°C; b) homopolymers of vinyl chloride and copolymers of vinyl chloride containing at least 80% by weight of vinyl chloride obtained by polymerization at a temperature of 0°C or below 0°C; c) mixtures of said polymers or copolymers a) and b); d) homopolymers and copolymers of vinyl chloride as defined under items a) and b) which have been post-chlorinated; e) mixtures of said polymers d) and a) or/and b) in any combination; and f) mixtures of syndiotactic polyvinyl chloride with post-chlorinated atactic polyvinyl chloride.

2. Description of the Prior Art

As is known, the above defined vinyl chloride fibers, because of their properties and particularly because of their nonflammability, are particularly suited for being used in pile fabrics, imitation furs, wigs, etc. The particularly enumerated applications require, however, that there be imparted to the fibers physical-chemical properties, optical properties and properties of touch similar to those of animal hair.

More particularly, chloro-vinyl fibers, as do generally all synthetic fibers, show a brightness or surface light reflection (sheen), which is much greater than that of animal hair.

In order to dull these fibers or, in general, to reduce their reflecting power, it has been suggested to incorporate into the fibers titanium oxide, or to adhere colloidal silicon to the surface thereof. In practice, however, the results thereby obtained have not been satisfactory.

In fact, the thus modified fibers still show a high reflection of light incident at a low angle on the surface of the fiber. This phenomenon brings with it an unpleasant effect which is quite different from that produced by animal hair. Moreover, the dullness caused by the adherence of the colloidal silicon on the surface of the fiber gradually decreases through repeated washings.

SUMMARY OF THE INVENTION

The present invention produces chloro-vinyl fibers which are similar to animal hair in surface brightness and feel.

The present invention provides a process of preparing these fibers, this process consisting of incorporating into the spinning solution of a polymer selected from the group consisting of a) homopolymers of vinyl chloride and copolymers of vinyl chloride containing at least 80% by weight of vinyl chloride, obtained by polymerization at a temperature greater than 0°C; b) homopolymer of vinyl chloride and copolymers of vinyl chloride containing at least 80% by weight of vinyl chloride obtained by polymerization at a temperature of 0°C or below 0°C; c) mixtures of said polymers or copolymers a) and b); d) homopolymers and copolymers of vinyl chloride as defined under items a) and b) which have been post-chlorinated; e) mixtures of said polymers d) and a) or/and b) in any combination; and f) mixtures of syndiotactic polyvinyl chloride with post-chlorinated atactic polyvinyl chloride, at least 1% by weight with respect to the polymer, of at least one white or colorless inorganic salt having a density greater than 2 g/cc, extruding the fiber by conventional means and then removing from the surface of the resulting fiber at least part of the added salt by contact with water or with another solvent for the added salt. Any white or colorless inorganic metal salt having a density greater than 2 g/cc may be used in the process of the invention.

DESCRIPTION OF THE PREFERRED EMBODIMENTS

In practice, however, best results from a practical point of view as well as from the point of view of the fiber are obtained by using salts of alkali metals. Such salts are relatively inexpensive and easy to use, and do not have any adverse effects upon the application characteristics of the fibers.

Examples of salts that may be conveniently used in the process of the invention include sodium sulphate, potassium sulphate, zinc sulphate, lead sulphate, zinc chloride, potassium bromate, sodium bromate, lead nitrate, zinc carbonate, and the like. Particularly preferred among these salts are potassium sulphate, sodium sulphate, potassium bromate and sodium bromate.

Of course, the granulometry of the added salt must be such as will not disturb the extrusion and stretching process and not to adversely influence the physical-mechanical characteristics of the fiber. For this purpose it is preferred that the maximum particle size not exceed 10 microns, although greater particle sizes, for example, up to 30 microns, may be used.

In accordance with the process of the invention for preparing the improved chloro-vinyl fibers, the white or colorless inorganic metal salt having a density greater than 2.0 g/cc is employed in a quantity of at least 1% by weight with respect to the weight of the polymer or mixture of polymers. In practice, quantities between about 2 and 15% by weight are preferred, although greater proportions of salt to polymer may be employed.

The spinning solution is prepared by dissolving the polymer or mixture of polymers in a suitable solvent and then adding the desired amount of salt. The spinning solution solvent may be any known solvent or mixture of solvents for these vinyl chloride polymers. Examples of such solvents include dimethylformamide, dimethylacetamide, cyclohexanone, tetrahydrofuran, furfurol, methyl ethyl ketone, acetone, binary mixtures such as carbon disulphide/acetone, perchloroethylene-/acetone, benzene/acetone, and the like, and ternary mixtures such as carbon tetrachloride/benzene/acetone, and the like.

Moreover, the salt may also be added to a spinning suspension consisting of the polymer or mixture of polymers suspended in liquids or a mixture of liquids possessing a swelling power without being solvents for the polymers. Examples of such liquids include, for instance, trichloroethylene, tetrachloroethane, chloroform, methylene chloride, acetone, benzene, toluene, dioxane, ethyl acetate, xylene, methyl tetrahydrofuran, and the like.

The spinning solution thus obtained is then extruded and coagulated according to either the dry or wet spinning processes. The thus obtained fibers are then washed with water to remove at least part of the added salt from the surface of the fibers. They are then stretched and subjected to heat treatments according to known spinning techniques. When the added salt is not soluble in water, it is necessary to treat the fibers either during one of the spinning phases or afterwards with a solvent for the salt.

The temperatures used in these spinning processes, as well as the stretch ratio and the operational conditions are conventional and depend upon the type of polymer or mixture of polymers used.

The surface brightness of the fiber is measured by the specularity index (SI) which is defined by the formula $$SI = (L_{70} - L_{69})/L_{70} \cdot 100$$

wherein $L_{70}$ is the quantity of light reflected at an angle of 70° from the surface of a sample illuminated with an incident light ray at an angle of 70°, and $L_{69}$ is the quantity of light reflected at an angle of 69° from the surface of a sample illuminated by a ray incident at 70°.

The quantity of reflected light is determined by means of a Carl Zeiss Type GP2 photogoniometer according to the following process:

a. Calibrating the Photogoniometer

The photogoniometer is calibrated in a conventional manner. For the following examples, this was accomplished as follows:

A shiny black plate is measured by fixing the incident ray at an angle of 70° and measuring the reflected light beam at 70° as a maximum of intensity; then the measuring angle is shifted by 1° (to 69°), and the intensity of the reflected light measured at this angle is to be a value of zero. Thereafter, the intensity of light reflected from a dull white plate is measured in the same manner; the light intensity measured both at an angle of 70° and after shifting the measuring angle by 1° always remains the same.

b. Preparation of the Sample

A dull black cardboard 52×150 mm in size is completely covered with the sample to be examined, after the filaments have been arranged in parallel by means of a classifier. The filaments thus arranged on the cardboard must be well stretched.

c. Determining the Specularity index of the Sample

On the sample thus prepared, the incident ray was fixed at an angle of 70° and the light reflected at an angle of 70° was measured, thereby obtaining the $L_{70}$ value; the measuring angle was then shifted to 69° and the $L_{69}$ value thus obtained was recorded.

The visual appearance of the fibers illuminated by normal sunlight is altogether similar to that of animal hair when the specularity index, as defined above, is not greater than 30.

The following examples are presented to better illustrate the present invention without thereby limiting the scope thereof.

EXAMPLES 1–22

25 parts of poly(vinyl chloride) having a syndiotacticity index of 2.2 and an intrinsic viscosity of 1.30 dl/g, measured in cyclohexanone at 25°C, and a quantity of a salt as recorded on the following table, were dissolved in 100 parts of cyclohexanone.

The spinning solution thus obtained was extruded through a spinneret into a coagulating bath consisting of 20% cyclohexanone, 40% ethyl alcohol and 40% water.

The fibers emerging from this coagulating bath were then washed with water, stretched while submerged in boiling water at a stretch ratio of 7:1, dried, shrunk by 10% and stabilized at 160°C.

The fibers thus obtained showed a count of 55 dtex, a tenacity of 1.8 g/den, an elongation at break of 60% and specularity index values as recorded on the following table:

| Example | Salt | Density of salt, g/cc | Salt concentration (%) with respect to the polymer | Specularity index |
|---|---|---|---|---|
| 1 | — | — | — | 61 |
| 2 | $Na_2B_4O_7 \cdot 10H_2O$ | 1.73 | 5.0 | 35 |
| 3 | $Na_2B_4O_7 \cdot 10H_2O$ | 1.73 | 10.0 | 34 |
| 4 | $(NH_4)_2SO_4$ | 1.77 | 5.0 | 34 |
| 5 | $(NH_4)_2SO_4$ | 1.77 | 10.0 | 32 |
| 6 | LiCl | 2.07 | 5.0 | 30 |
| 7 | LiCl | 2.07 | 10.0 | 30 |
| 8 | $KNO_3$ | 2.11 | 5.0 | 30 |
| 9 | $KNO_3$ | 2.11 | 10.0 | 30 |
| 10 | $K_2SO_4$ | 2.66 | 2.0 | 25 |
| 11 | $K_2SO_4$ | 2.66 | 5.0 | 22 |
| 12 | $Na_2SO_4$ | 2.70 | 1.0 | 30 |
| 13 | $Na_2SO_4$ | 2.70 | 2.0 | 22 |
| 14 | $Na_2SO_4$ | 2.70 | 5.0 | 20 |
| 15 | $KBrO_3$ | 3.27 | 2.0 | 26 |
| 16 | $KBrO_3$ | 3.27 | 5.0 | 25 |
| 17 | $NaBrO_3$ | 3.34 | 2.0 | 26 |
| 18 | $NaBrO_3$ | 3.34 | 5.0 | 25 |
| 19 | $ZnSO_4$ | 3.74 | 2.0 | 25 |
| 20 | $ZnSO_4$ | 3.74 | 5.0 | 20 |
| 21 | $2PbCO_3 \cdot Pb(OH)_2$ | 6.14 | 2.0 | 18 |
| 22 | $2PbCO_3 \cdot Pb(OH)_2$ | 6.14 | 5.0 | 20 |

As it can be seen from Examples 1 to 5, given for the purpose of comparison, when an inorganic salt having a density lower than 2 g/cc is used, and when no inorganic salt is added, the fibers obtained show a specularity index greater than 30 and a brightness or surface light reflection (sheen) which is much greater than that of animal hair.

Variations can, of course, be made without departing from the spirit and scope of the invention.

Having thus described the invention, what is desired to be secured by Letters Patent and hereby claimed is:

1. A process for preparing chlorovinyl fibers having reduced light reflection, said process consisting essentially of incorporating into a spinning solution of a vinyl chloride polymer selected from the group consisting of (a) homopolymers of vinyl chloride and copolymers of vinyl chloride containing at least 80% by weight of vinyl chloride obtained by polymerization at a temperature greater than 0°C; (b) homopolymers of vinyl chloride and copolymers of vinyl chloride containing at least 80% by weight of vinyl chloride obtained by polymerization at a temperature of 0°C or below 0°C; (c) mixtures of said polymers or copolymers (a) and (b); (d) homopolymers and copolymers of vinyl chloride as defined under items (a) and (b) which have been post-chlorinated; (e) mixtures of said polymers (d) and (a) or/and (b) in any combination; and (f) mixtures of syndiotactic polyvinyl chloride with post-chlorinated atactic polyvinyl chloride, about 2 to 15% by weight, based on the weight of said polymer, of a white or colorless inorganic metal salt selected from the group consisting of potassium sulphate, sodium sulphate, potassium bromate and sodium bromate and having a density greater than 2 g/cc and a particle size of up to about 30 microns, extruding the fibers, removing from the surface of the thus extruded fibers at least a portion of said added salt by contacting said fibers with a solvent for the added salt, stretching the extruded fibers and then drying and heat stabilizing the stretched fibers.

2. The process of claim 1, wherein the solvent for said added salt is water.

3. The process of claim 1, wherein the vinyl chloride polymer is poly(vinyl chloride).

4. The process of claim 1 wherein the particle size of said salt is at most 10 microns.

* * * * *

PO-1050
(5/69)

UNITED STATES PATENT OFFICE
CERTIFICATE OF CORRECTION

Patent No. 3,879,506            Dated April 22, 1975

Inventor(s) Paolo Melacini, Helmut Kirschner & Paolo Campana

It is certified that error appears in the above-identified patent and that said Letters Patent are hereby corrected as shown below:

Title page, left side, under "Inventors": "Helmut Kirschner, Abano;" should read -- Helmut Kirschner, Abano Terme; --.

Title page, left side, under "Foreign Application Priority Data": "25392/70" should read -- 25392-A/70 --.

Signed and sealed this 1st day of July 1975.

(SEAL)
Attest:

RUTH C. MASON
Attesting Officer

C. MARSHALL DANN
Commissioner of Patents
and Trademarks